US009559416B2

(12) United States Patent
Chang

(10) Patent No.: US 9,559,416 B2
(45) Date of Patent: *Jan. 31, 2017

(54) ACCESSING LP TRANSPONDERS WITH CP TERMINALS VIA WAVEFRONT MULTIPLEXING TECHNIQUES

(71) Applicant: SPATIAL DIGITAL SYSTEMS, INC., Agoura Hills, CA (US)

(72) Inventor: Donald C. D. Chang, Thousand Oaks, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,266

(22) Filed: Jul. 10, 2013

(65) Prior Publication Data

US 2013/0302034 A1    Nov. 14, 2013

Related U.S. Application Data

(63) Continuation of application No. 13/172,620, filed on Jun. 29, 2011, now Pat. No. 8,538,326.

(Continued)

(51) Int. Cl.
*H01Q 3/24* (2006.01)
*H01Q 9/04* (2006.01)
(Continued)

(52) U.S. Cl.
CPC .............. *H01Q 3/24* (2013.01); *H01Q 9/0407* (2013.01); *H01Q 21/245* (2013.01); *H04J 14/06* (2013.01)

(58) Field of Classification Search
None
See application file for complete search history.

(56) References Cited

U.S. PATENT DOCUMENTS 4,308,541 A    12/1981  Frosch et al.
5,086,301 A     2/1992  English et al.
(Continued)

FOREIGN PATENT DOCUMENTS

EP    0632525 A    1/1995

OTHER PUBLICATIONS

Prasad, R.; "OFDM for Wireless communications systems" ; Artech House; 2004, download form a website of "ebooks download free" and download link is "http://www.ebooksdownloadfree.com/Miscellaneous/OFDM-for-Wireless-Communications-Systems-BI21455.html".

(Continued)

*Primary Examiner* — Alejandro Rivero

(57) ABSTRACT

The invention is about a method and apparatus for grouping multiple satellite transponders with both (LP) polarization formats in different frequencies through Wave-Front (WF) Multiplexing (muxing) techniques for ground terminals with incompatible (CP) polarization formats. As a result of this invention, linear polarized (LP) transponders can be accessed and efficiently utilized by circularly polarized (CP) ground terminals and vice versa. This invention consists of conventional ground terminals, a unique organization of space assets, and a unique polarization alignment processor. The applications of wavefront multiplexing techniques to satellite communications offer many potential advantages, including improved flexibility and utility efficiency of existing space assets. Our proposed "Polarization Utility Waveforms" is an entirely new concept in VSAT and Earth Station Antenna diversity. The implementation enables antennas to switch between different polarization formats at the press of a button, and provides teleport operators with greater flexibility in how they manage their assets.

18 Claims, 9 Drawing Sheets

Related U.S. Application Data

(60) Provisional application No. 61/497,852, filed on Jun. 16, 2011.

(51) Int. Cl.
*H01Q 21/24* (2006.01)
*H04J 14/06* (2006.01)

(56) References Cited

U.S. PATENT DOCUMENTS

| | | | |
|---|---|---|---|
| 5,675,285 | A | 10/1997 | Winters |
| 5,760,660 | A | 6/1998 | Nagatsu et al. |
| 6,006,111 | A | 12/1999 | Rowland |
| 6,456,824 | B1 | 9/2002 | Butte |
| 6,507,952 | B1 | 1/2003 | Miller et al. |
| 6,931,245 | B2 | 8/2005 | Fikart |
| 7,043,198 | B2 | 5/2006 | Hanson |
| 7,636,546 | B2 | 12/2009 | Karabinis |
| 7,925,232 | B2 | 4/2011 | Barak et al. |
| 7,957,425 | B2 | 6/2011 | Macrae |
| 7,970,346 | B2 | 6/2011 | Karabinis |
| 8,098,612 | B2 | 1/2012 | Chang |
| 8,111,646 | B1 | 2/2012 | Chang |
| 8,355,470 | B1 | 1/2013 | Mason et al. |
| 8,538,326 | B2 | 9/2013 | Chang |
| 8,862,050 | B2 | 10/2014 | Chang |
| 2002/0061752 | A1 | 5/2002 | Kurokami |
| 2004/0264592 | A1* | 12/2004 | Sibecas et al. ............... 375/267 |
| 2006/0128336 | A1* | 6/2006 | Waltman et al. ............. 455/273 |
| 2007/0072545 | A1 | 3/2007 | Agnew et al. |
| 2007/0135050 | A1 | 6/2007 | Schiff |
| 2008/0032756 | A1 | 2/2008 | Kanazawa |
| 2008/0119190 | A1 | 5/2008 | Karabinis |
| 2008/0291864 | A1* | 11/2008 | Chang ................. H04B 7/2041 370/316 |
| 2008/0317098 | A1 | 12/2008 | Juntunen |
| 2009/0061760 | A1* | 3/2009 | Barak et al. ................. 455/3.02 |
| 2009/0170429 | A1 | 7/2009 | Karabinis |
| 2011/0111692 | A1 | 5/2011 | Grotz |
| 2011/0197740 | A1 | 8/2011 | Chang |
| 2011/0243562 | A1 | 10/2011 | Jackson et al. |
| 2011/0267141 | A1 | 11/2011 | Hangai et al. |
| 2012/0028572 | A1 | 2/2012 | Lu |
| 2012/0319772 | A1 | 12/2012 | Chang |

OTHER PUBLICATIONS

Jiang, M.; "Multi-user MIMO-OFDM for Next-Generation Wireless Systems;" Proceedings of the IEEE, vol. 95; Jul. 7, 2007.

Chu, T. S.; Restoring the orthogonality of two polarizations in radio communications systems Bell Sys. Tech. J.; vol. 50; No. 9; pp. 3063-3069; Nov. 1971.

Sollenberger, N., Winters, J., Li. Y.; "MIMO-OFDM for wireless Communications: signal Detection with Enhanced Channel Estimation;" IEEE Trans. on Communication, vol. 50; No. 9; Sep. 2002.

\* cited by examiner

Wavefront (WF) muxing
via polarizations only $$\begin{bmatrix} x1 \\ x2 \end{bmatrix} = \begin{bmatrix} 1 & i \\ i & 1 \end{bmatrix} \begin{bmatrix} s1 \\ s2 \end{bmatrix}$$

510  511  512  513

Wavefront (WF) muxing
via both polarizations and frequencies $$\begin{bmatrix} x1 \\ x2 \\ x3 \\ x4 \end{bmatrix} = \begin{bmatrix} 1 & i & 1 & i \\ i & 1 & i & 1 \\ 1 & i & -1 & -i \\ i & 1 & -i & -1 \end{bmatrix} \begin{bmatrix} s1 \\ s2 \\ s3 \\ s4 \end{bmatrix}$$

ACCESSING LP TRANSPONDERS WITH CP TERMINALS VIA WAVEFRONT MULTIPLEXING TECHNIQUES

RELATED APPLICATION DATA

This application is a continuation of application Ser. No. 13/172,620, filed on Jun. 29, 2011, now pending, which claims the benefit of provisional application No. 61/497,852 filed Jun. 16, 2011.

BACKGROUND OF THE INVENTION

1. Field of the Invention

The present invention relates to radio frequency communications devices. More particularly, it relates to allowing satellite transponders and ground terminals that utilize one polarization method (linear or circular polarization) to be able to cross-communicate with each other via wavefront multiplexing techniques. This offers many potential advantages, including but not limited to improved flexibility and increased efficiency of existing assets.

2. Description of Related Art

Satellite Communications (SATCOM) technologies have increased dramatically and have transitioned to IP-based services consistent with concepts for net-centric operations. Their increased use has resulted in a proliferation of IP-based products using satellites for back-bone or transport applications. On the other hand, high-speed satellite communications for access typically emanate from reflector antennas that basically radiate and receive in narrow beams.

Compatible polarization configurations between terminals and space assets are essential to efficient satcom links. It is generally true that the LP polarized terminals will use LP transponders, and CP terminals relay data via CP transponders. When ground terminals switch services from a provider with CP satellites to another one with LP satellites, their antenna polarizations are reconfigured accordingly, to prevent 3 dB SNR losses in receiving (Rx) functions on the one hand, and to avoid generating unwanted radiations in transmit (Tx) functions on the other hand. Our approach is very different than those of polarization switching, and would not require users to switch polarizations based on their equipment. Circularly Polarized (CP) users can use their existing terminals to relay data to CP destinations via linearly polarized (LP) transponders. There are no space asset losses due to the incompatibility. The method of LP space asset reorganization is the key for operationally circumventing the "incompatibility" issue.

A concept of the virtual-link concurrently utilizes N communications links organized by Wavefront (WF) Multiplexing (Muxing). A WF carrying a signal stream features a fixed spatial phase distribution among selected N parallel links, which support up to N orthogonal WFs carrying N independent signals concurrently from a source to a destination. The virtual link techniques are referred to as Orthogonal Wave-Front Diversity Multiplex (OWFDM), and the enabling signal structures as OWFDM waveforms.

Virtual links can be applied for satellite communications transporting data within a field of views common to selected transponders. Our proposed "Polarization Utility Waveforms" can successfully deliver signals via LP transponding satellites using CP ground terminals, and vice versa. They are engineered via techniques of signals spreading over multiple transponders. The waveforms may look like OFDM waveforms and also may appear as MIMO formats, but they are not. They are subsets of OWFDM waveforms and may feature unique format interconnecting OFDM and MIMO through an orthogonal signal structure.

WF muxing/demuxing techniques are powerful tools for path length equalizations among parallel paths/channels. SDS has applied these techniques for various applications; (1) Power combining from multiple transponders from the same satellites and/or different transponding satellites [1], (2) back channel equalization for ground based beam forming process in satellite applications [2], and (3) Distributed data storage [3].

Uniqueness of the OWFDM

Unlike OFDM for commercial wireless communications feature waveforms with multiple orthogonal sub-carriers uniformly distributed in a frequency band, our proposed OWFDM techniques will spread transmitting (Tx) signals into multiple channels with a unique phase distribution pattern, referred to as a wavefront (WF). These channels may be assigned to different frequency slots, time slices, polarizations, and/or orbital positions when these space assets are available. The selected multi-dimensional waveforms may be dynamic, and reconfigurable. There will always be embedded pilot signal streams through the same propagating paths, but distributed in phase distribution patterns orthogonal to the one which carries the desired signal stream. In short, the WFs are orthogonal to one another.

In general, the OWFDM waveforms must meet existing SATCOM polarization and frequency convention restrictions. At a ground station, transmitting (Tx) signals may be preprocessed by a WF multiplexer (muxer), which spreads coherent signals into multiple channels concurrently in the form of an orthogonal structure in a selected N-dimensional domain. The generated orthogonality is among multiple wavefronts (WFs). With N parallel propagating channels, there are N-orthogonal WFs available. Probing signal streams will be attached to at least one of them. The remaining WFs are available for various Tx signal streams.

Signals originated from a ground terminal propagating through various uplink carriers/paths, including multiple transponders on a satellite or among many satellites, and different down link frequencies/paths arriving at a destination feature differential phase delays, Doppler drifts, and amplitude amplifications/attenuations.

Post processing implemented at receiving (Rx) sites will equalize the differential phase delays, frequency drifts and amplitude attenuations among signals through propagating paths. Calibrations and equalizations take advantages of embedded probe signals and iterative optimization loops. There are no feedbacks required through back channels. As a result of the equalizations, the Rx WFs become orthogonal, and the attached signals streams are then precisely reconstituted by the WF demuxer.

SUMMARY OF THE INVENTION

This invention presents a subset of OWFDM waveforms taking advantage of polarization incompatibility (CP vs. LP) to access available space assets when the ground terminals are not polarization compatible. We will present the operation concepts and associated mechanisms for CP-equipped terminals to access LP satellites without sacrificing space asset utility efficiencies and capacity. Similar methods can be implemented for LP terminals to access CP satellites. In addition, these techniques also enable sources with CP terminals to communicate sinks with LP terminals via satellite assets with either CP or LP polarization formats as long as the sources and sinks are within the field of view of the selected satellite assets.

Special OWFM waveforms are constructed under the constraints that all the user terminals feature only one of the two available CP options while the space assets in geostationary satellites feature both LP channels of separated transponders in an orbital slot. As a result, the targeted LP space assets support not only regular LP users but also additional CP customers without power and bandwidth capacity losses due to the polarization incompatibility.

We will use SCPC (single channel per carrier) channels as examples for illustrations. However, the concepts can be extended for scenarios such as MCPC cases. SCPC refers to using a single signal at a given frequency and bandwidth so the satellite bandwidth is dedicated to a single source. Multiple channels per carrier (MCPC), on the other hand, uses several subcarriers that are combined into a single bitstream before being modulated onto a carrier transmitted from a single location to one or more remote sites.

Among additional benefits, these techniques will provide means for dynamic space resource allocations such as down link power, or equivalently D/L EIRP. Various channels, such as SCPCs in different transponders, are grouped and utilized by multiple users via OWFDM, therefore, the combined "power" assets can be dynamically assigned to any of the users as long as the total power outputs are constant. For example, two independent CP users accessing a two convention 5 W CP SCPC channels separately, both user may only draw a maximum of 5 W. On the other hand, when the same independent CP users accessing two 5 W LP SCPC channels organized by OWFDM concurrently, the first user may draw 8 W while the second user only need 2 W, and at a later time the first user may not need to transmit any more while the second user can access both transponders coherently to get 10 W equivalent "transponder power"; or a 3 dB more gain on equivalent EIRP.

REFERENCES

1. U.S. patent application Ser. No. 12/462,145; "Communication System for Dynamically Combining Power from a Plurality of Propagation Channels in order to Improve Power Levels of Transmitted Signals without Affecting Receiver and Propagation Segments," by D. Chang, initial filing on Jul. 30, 2009.
2. U.S. patent application Ser. No. 12/122,462; "Apparatus and Method for Remote Beam Forming for Satellite Broadcasting Systems," by Donald C. D. Chang; initial filing May 16, 2008
3. U.S. patent application Ser. No. 12/848,953. "Novel Karaoke and Multi-Channel Data Recording/Transmission Techniques via Wavefront Multiplexing and Demultiplexing," by Donald C. D. Chang, and Steve Chen Initial Filing on Aug. 2, 2010
4. U.S. patent application Ser. No. 12/847,997; "Polarization Re-alignment for Mobile Satellite Terminals," by Frank Lu, Yulan Sun, and Donald C. D. Chang; Filing on Jul. 30, 2010

BRIEF DESCRIPTION OF THE DRAWINGS

FIG. 5b depicts the two mathematic matrix equations converting CP signals into LP channels as they are captured by LP satellite. The differential propagation effects are not included. The one on the left represents the conversions of two CP signals, s1 in RHCP and s2 in LHCP, into two aggregated LP signals in an HP and a VP SCPC channels. The one on the right is a 4-to-4 mathematic matrix equation representing signal conversions in four LP SCPC channels; two in HP and two in VP at two identical frequency slots. The symmetric matrix is constructed under the constraints that all the user terminals feature only one of the two available CPs but with both frequency slots.

DETAILED DESCRIPTION OF THE PREFERRED EMBODIMENT

Figure 1:
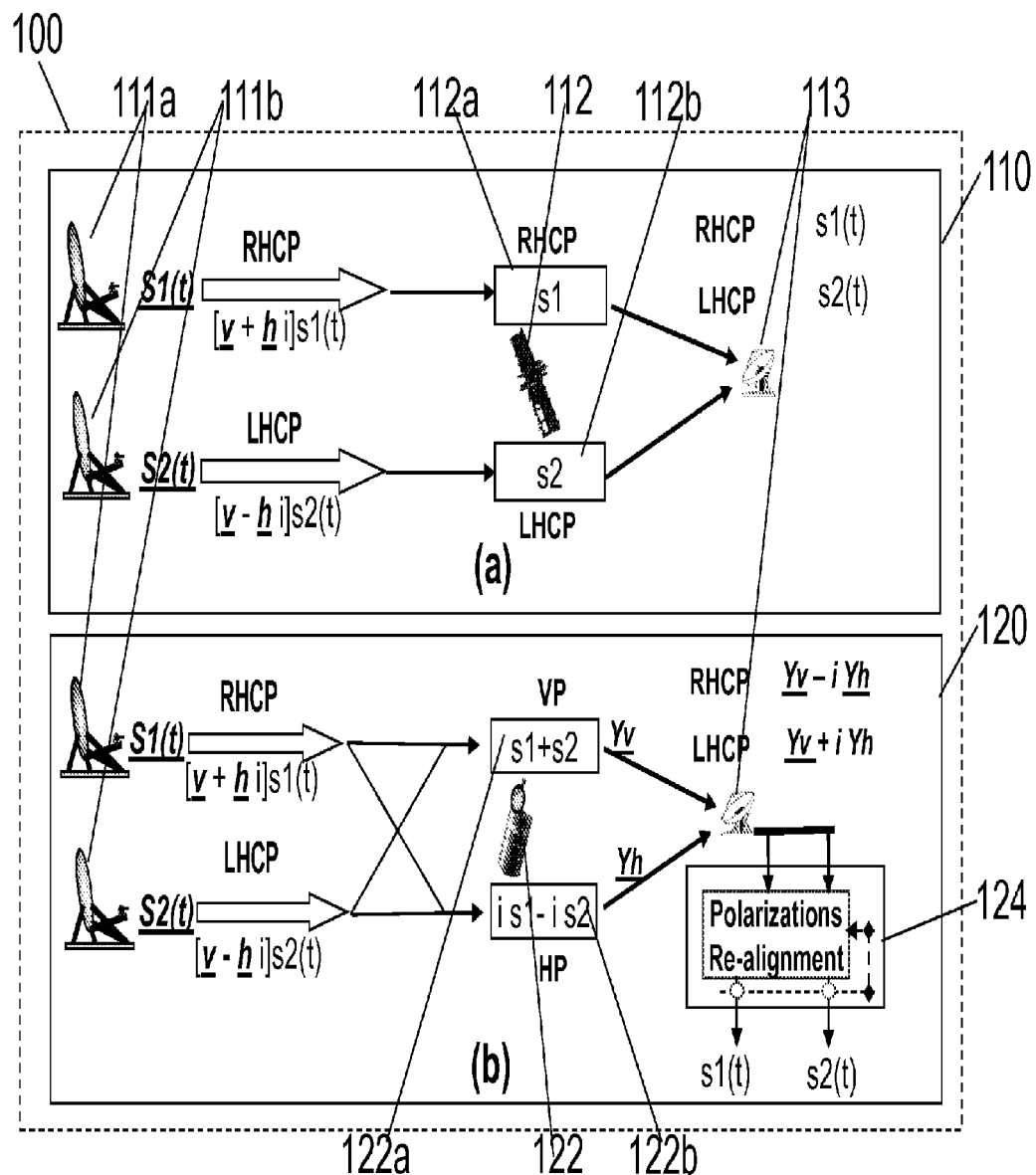
FIG. 1 depicts simplified block diagram of a LP satellite accessed by two CP terminals to relay independent data streams to a CP hub station. It displays return-links from two users to a hub.

FIG. 1 100 illustrates examples of our proposed techniques assuming that CP satcom ground terminals are within a common field of view of both transponding satellites. They are return-links (RL) examples depicting communications from 2 remotes to a hub through transponding satellites.

Panel (a) 110 illustrates a conventional technique accessing a CP space asset 112 via CP terminals 111 and 113. Terminals 1 111a and 2 111b are relaying independent data streams $s1(t)$ and $s2(t)$ to a hub through a CP satellite 112. The terminal 1 111a in right-hand circularly-polarized (RHCP) is allocated for RHCP SCPC channel 112a at a frequency slot, fo, on the CP satellite. SCPC stands for Single channel per carrier and refers to using a single signal stream at a given frequency and bandwidth. Similarly, the terminal 2 111b in left-hand circularly-polarized (LHCP) is allocated for a second SCPC channel 112b at the same frequency slot, fo, but in LHCP on the satellite. As a result, s1(t) goes through a RHCP transponder while s2(t) is independently conditioned by another transponder in LHCP, respectively. Hub 113 receives both s1(t) and s2(t) independently through separated antenna ports; s1(t) from a RHCP port and s2(t) a LHCP port.

Panel (b) 120 depicts an operational scenario where CP terminals 111 relay data through a LP satellite 122. Specifically, SCPC channels 122a and 112b are used in the LP satellite, with 1 HP and 1 VP channels on an identical frequency slot.

Mathematically, we select a set of 2-dimensional orthogonal Wave-Front (WF) vectors [1, i] and [1, −i] to match with the signal structures of polarizers for RHCP and LHCP signals. The 2-to-2 WF muxers and demuxers are implemented by analog polarizers in RF instead of 2-to-2 FFT digital processors.

$$S1(t)=[v+hi]s1(t) \quad (1a)$$

$$S2(t)=[v-hi]s2(t) \quad (1b)$$

S1 radiated by terminal 111a feature RHCP while S2 by terminal 111b is in a LHCP format. Equivalently, S1 in RHCP is transmitted in both HP and VP with a fixed phase distribution, where the phase in HP is always 90° ahead of that in VP.

As the S1 signals in RHCP arrive at LP satellite 122, both VP and HP components will be picked up concurrently by two SCPC channels at a common frequency slot with one in VP 122a and the other in HP 122b transponders accordingly as depicted.

Similarly, S2 is also transmitted in both HP and VP concurrently with a fixed phase distribution, with the phase in HP is always 90° behind that in VP. As the S2 signals in LHCP arrive at LP satellite 122, both VP and HP components will be picked up "concurrently" by two SCPC channel, one in VP 122a and the other in HP 122b transponders accordingly as depicted.

Each LP SCPC channel is occupied by two independent signals s1 and s2 concurrently. As far as each SCPC channel is concerned, the two signals are not seperable since they are not multiplexed by code, time or frequency. On the other hand, there are "relationships" between the two s1 signals in both SCPC channels, and similarly but different relationships for s2 signals. The two sets of relationships are two orthogonal "wavefronts" (WFs). Becused the unique relationship, s1 and s2 can be seperated and recovered when both SCPC channels are processed simultaneously.

The conditioned signals by VP SCPC 112a and HP SCPC 122b are designated as Yh (t) and Yv(t), respectively. The amplitude attentuations and phased delays due to propagation and on board electronics for the HP and VP paths are identified as (Ah and Av) and (α and β) respectively.

The signals arriving at a CP hub and the RF polarizer from Rx CP antennas will serve as WF demuxer functions, where the two concurrent CP antenna outputs will be $$Zrhcp(t)=[Av\exp(j\alpha)*Yv(t)-iAh\exp(j\beta)*Yh(t)]/2 \quad (2a)$$

$$Zlhcp(t)=[Av\exp(j\alpha)*Yv(t)+iAh\exp(j\beta)Yh(t)]/2 \quad (2b)$$

Furthermore, in terms of s1 and s2, Equation (1) can be re-written as $$Z\ rhcp(t) = [Av\exp(j\alpha)*(s1+s2) - iAh\exp(j\beta)*(is1-is2)]/2 = \quad (3a)$$
$$s1[Av\exp(j\alpha) + Ah\exp(j\beta)]/2 + s2[Av\exp(j\alpha) - Ah\exp(j\beta)]/2,$$

$$Z\ lhcp(t) = [Av\exp(j\alpha)*(s1+s2)Yv + iAh\exp(j\beta)(is1-is2)]/2 = \quad (3b)$$
$$s1[Av\exp(j\alpha) - Ah\exp(j\beta)]/2 + s2[Av\exp(j\alpha) + Ah\exp(j\beta)]/2.$$

The two wavefronts will no longer by orthogonal by the time they arrive at destination 113. Diagnostic and equalization circuits 124 are implemented to dynamically compensate for the amplitude and phase differentials among the HP and VP paths. As the amplitude and phase effects on the two paths are equalized, the WFs become orthogonal, and the associated signals can then be precisely reconstituted.

From the point of view of satellite operators, the LP space assets (RF power and frequency bandwidth) from SCPC channels 112a and 112b are grouped together and shared by two seperate users via unique orthogonal waveforms in conventional RHCP and LHCP. Each SCPC channel transponds to one of the aggregated wavefront components (wfc). It always takes two components to re-construct relayed signals It should be noted that the two linear transponders may not be from the same satellite. There are occasions where two LP transponders covering the same service areas are from two different satellites.

Figure 2:
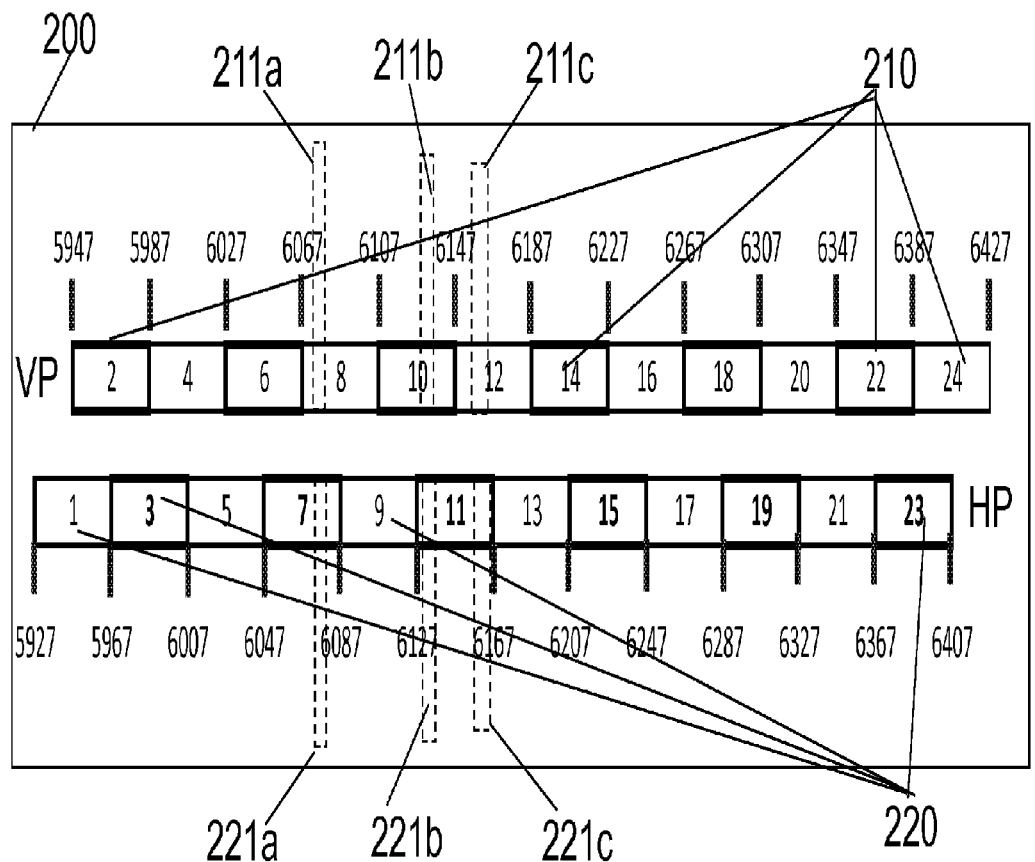
FIG. 2 illustrates three sets of selected SCPC channels on a LP satellite to accommodate CP users. Each set features two SCPC channels on a common frequency slot.

FIG. 2 200 depicts a typical uplink frequency plan of a C-band satellite with 24 transponders, 36 MHz bandwidths for individual transponders with a 4 MHz guide band in between adjacent slots. HP transponders 220 are numbered odd, while VP transponders 210 are even-numbered, while the center frequencies of the two sets are offset by 20 MHz.

Among the total 864 MHz (36 MHz*24) available LP bandwidth, 736 MHz are convertible for serving CP users due to a fixed frequency offset among the HP and VP transponders and 4 MHz guard bands among adjacent transponders. The remaining 128 MHz bandwidth can only serve LP users.

Three pairs of the communications channels, (211a, 221a), (211b, 221b), and (211c, 221c), at three different frequency slots are identified. Each pair features both HP and VP channels, illustrating two selected SCPC channels on a LP satellite to accommodate two CP users.

Figure 3:
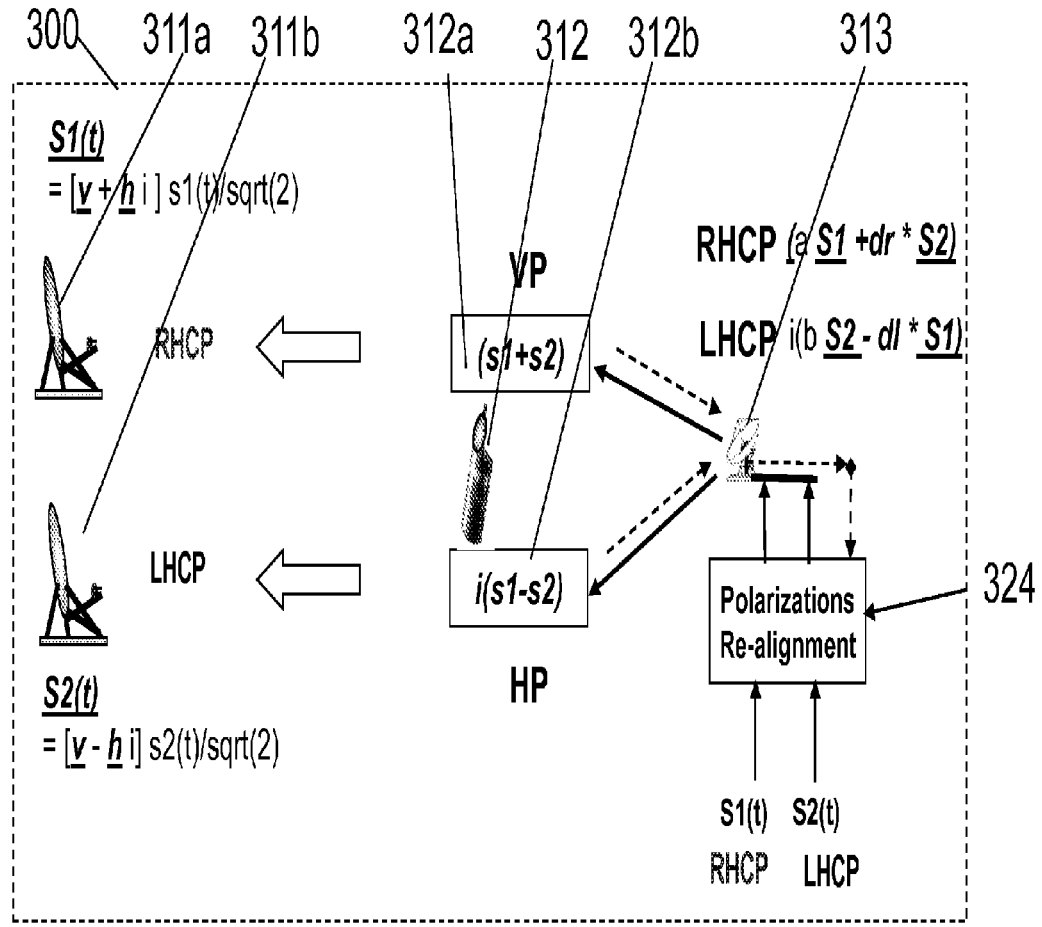
FIG. 3 illustrates the corresponding forward links for the two users in FIG. 1.

FIG. 3 300 depicts the same scenario as that in FIG. 1, except it is for "forward links" communications flows from CP hub 313 to CP remotes 311 through LP satellite 312. Preprocessing unit 324 in the hub is used to "pre-compensate" for the amplitude and phase differentials among the two propagation paths. Relay satellite 312 covers both source and destinations. Signals in the corresponding downlink channels for terminal-1 311a and terminal-2 311b are available locally at the source location 313. These signals can be used as those from feedback channels for the pre-compensation processing 324.

Figure 4:
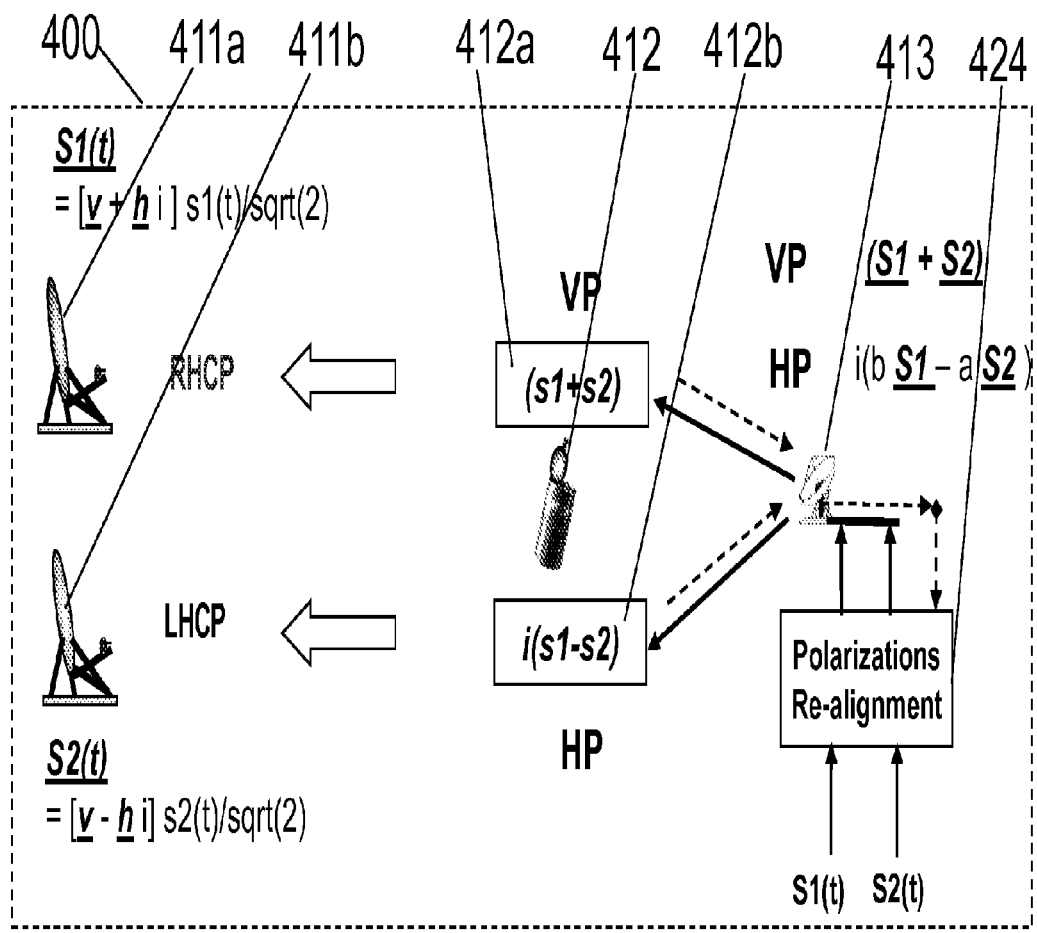
FIG. 4 illustrates the corresponding forward links for the two users in FIG. 1 but from a LP hub.

FIG. 4 400 depicts the similar scenario as that in FIG. 3 in that FIG. 4 also depicts "forward links" communications flows. FIG. 3 is from CP hub 313 to CP remotes 311 through LP satellite 312. FIG. 4 depicts signals transmit from LP hub 413 to two CP remotes 411 through LP satellite 412. LP hub 413 requires transmission capabilities for both HP and VP polarization. Pre-processing unit 414 performs two linear combinations combining s1 (the signals for terminal-1 411a), and s2 (the signal for terminal-2 411b) signals. The weightings among the two linear combinations are to generate two equivalent CP signals at anticipated destinations 411a and 411b, and shall include effects from propagations and unbalanced electronics on ground and in space. Coverage from relay satellite 412 includes both source 413 and destination locations 411a and 411b. Signals in the corresponding down-link channels for terminal-1 and terminal-2 are available locally at source location 413. These signals will be used as those from feedback channels to optimize pre-compensation processing 414.

Figure 5A:
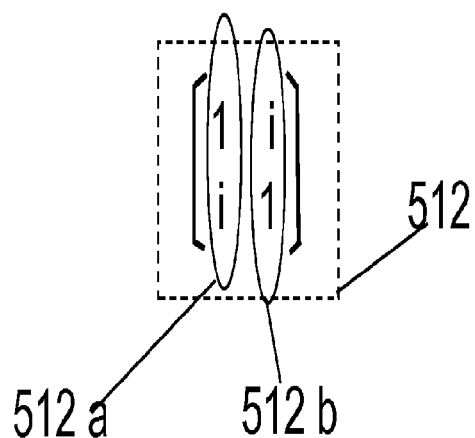
FIG. 5a depicts two mathematic matrixes, with one on the left a 2-to-2 Wavefront muxing matrix for two-signal processing, while the one on the right is a 4-to-4 math matrix. The symmetric matrix on the left is constructed under the constraints that all the user terminals feature only one of the two available CPs. The symmetric matrix on the right is constructed under the constraints that all the user terminals feature only one of the two available CPs but with both frequency slots.
Figure 5A:
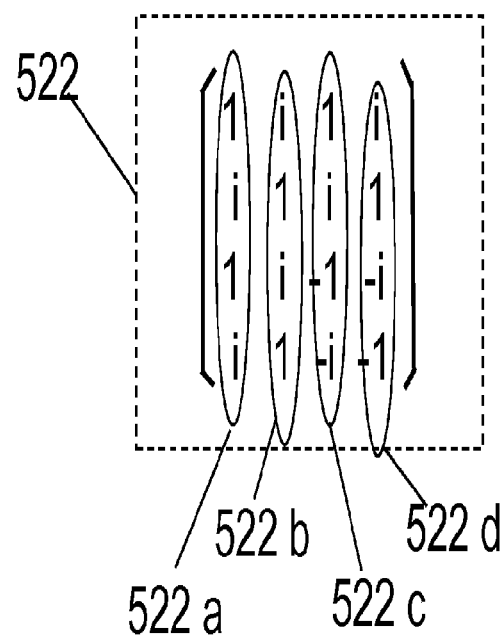

FIG. 5a depicts wavefront multiplexing matrixes 512 and 522 for CP user terminals to access multiple communications channels in LP satellites. The 2-by-2 matrix 512 converts two independent CP signals (RHCP 512a and LHCP 512b) into two signal streams in LP (one in HP and the other in VP). All signal streams (two inputs and two outputs) are at frequency slot f1.

Similarly, 4-by-4 matrix 522 converts 4 independent CP signals (RHCP 522a and 522c and LHCP 522b and 522d). As a result, an input stream is replicated in every output stream, and each output stream consists of all input streams.

FIG. 5b depicts the two mathematic matrix equations 510 and 520 converting CP signals into LP channels as they are captured by LP satellite. Differential propagation effects are not included. Matrix 510 represents the conversions of two CP signals 513, s1 in RHCP and s2 in LHCP, into two aggregated LP signals 511 in HP and VP SCPC channels. Symmetrical conversion matrix 512 is the WF muxing processor and is referred as Mf2.

$$Mf2 = \begin{bmatrix} 1 & i \\ i & 1 \end{bmatrix} \quad (4a)$$

It should be noted that Mf2 can be used to convert two CP signals into two LP signals, and it can also convert two LP signals into two CP signals. Furthermore, $$\tfrac{1}{2} \cdot Mf2 \cdot Mf2^{*T} = I \quad (4b)$$

Mf2 can be used as a WF muxer and its corresponding WF demuxer will be $Mf2^{*T}$. The resulting wavefronts (WFs) 512a and 512b as depicted in FIG. 5a are orthogonal to each other.

Matrix 520 is a 4-to-4 mathematic equation representing signal conversions from 4 CP signals 523 in four LP SCPC channels 521, with two in HP and two in VP at two identical frequency slots. The symmetric matrix 522 is constructed under the constraints that all the user terminals feature only one of the two available CPs but with both frequency slots.

Symmetrical conversion matrix 522 is the WF muxing processor and is referred as Mf4, where $$Mf4 = \begin{bmatrix} 1 & i & 1 & i \\ i & 1 & i & 1 \\ 1 & i & -1 & -i \\ i & 1 & -i & -1 \end{bmatrix} \quad (5a)$$

It should be noted that Mf4 can be used to convert four CP signals into four LP signals, and can also convert four LP signals into four CP signals. Furthermore, $$\tfrac{1}{4} \cdot Mf4 \cdot Mf4^{*T} = I \quad (5b)$$

Mf4 can be used as a WF muxer and its corresponding WF demuxer will be $Mf4^{*T}$. The four resulting wavefronts (WFs) 522a, 522b, 522c, and 522d as depicted in FIG. 5a are orthogonal to each other.

Figure 5C:
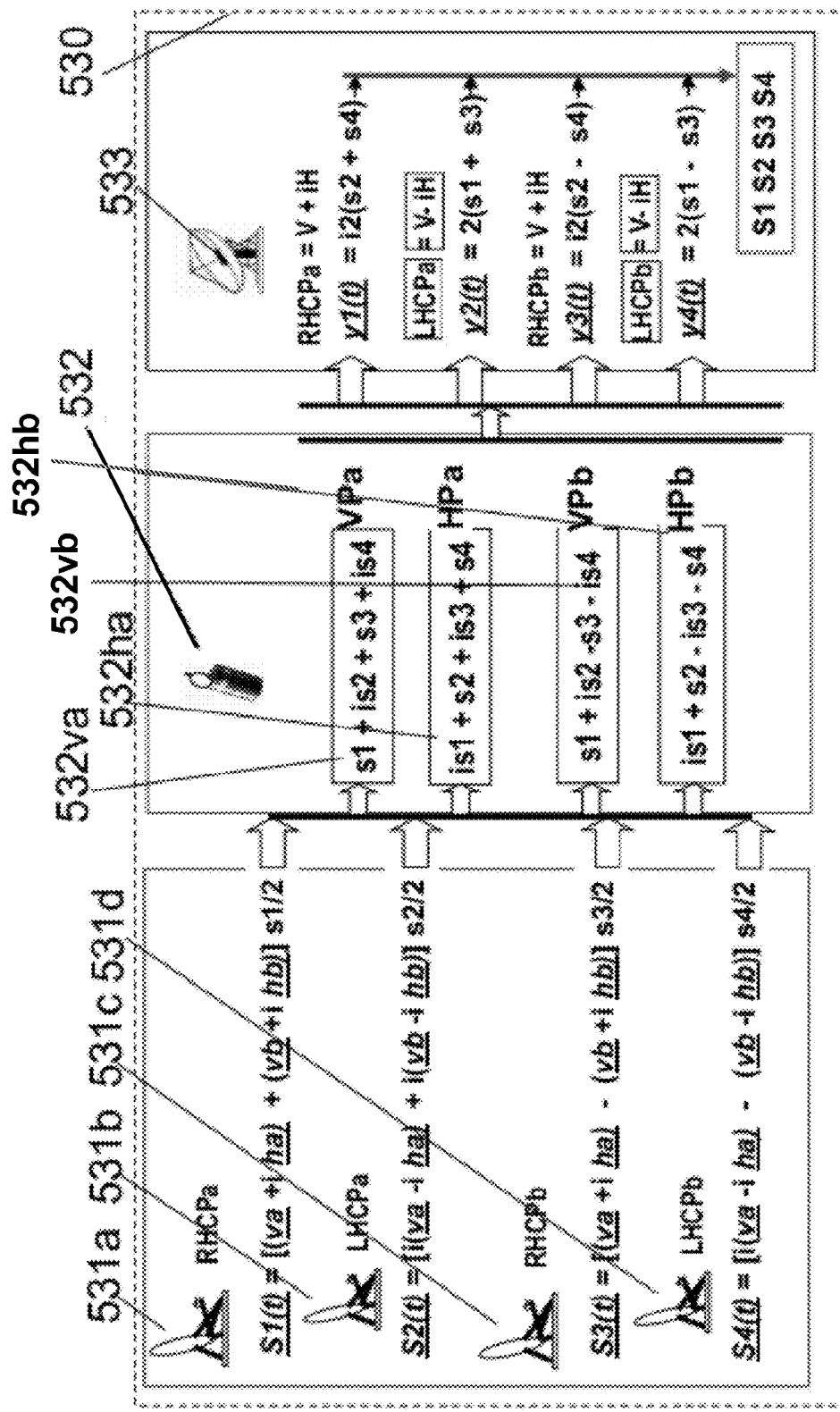
FIG. 5c illustrates a simplified block diagram of a LP satellite accessed by four CP terminals to relay independent data streams back to a CP hub station utilizing the same matrix conversion assumptions in FIG. 5b. It displays return-links from four users to a hub. The architecture is constructed under the constraints that all the user terminals feature only one of the two available CPs but with both frequency slots.

In FIG. 5c 530, two CP pairs are split for two common frequency slots; 1 pair of CP at fa and the other pair at fb. Similarly, the two LP pairs are for the same two common frequency slots; 1 pair of LP at fa and the other pair at fb.

S1 is a waveform occupying two RHCP channels, one at fa and the other at fb carrying signal s1 radiated by terminal-1 531a.

S2 is a waveform occupying two LHCP channels, one at fa and the other at fb carrying signal s2 radiated by terminal-2 531b S3 is a waveform occupying two RHCP channels, one at fa and the other at fb carrying signal s3 radiated by terminal-3 531c.

S4 is a waveform occupying two LHCP channels, one at fa and the other at fb carrying signal s4 radiated by terminal-4 531d When these signals arrive at a LP satellite 532, the 4 LP channels will feature the following aggregated signals:
VP channel at fa 532va: s1+is2+s3+is4
HP channel at fa 532ha: is1+s2+is3+s4
VP channel at fb 532vb: s1+is2−s3−is4
HP channel at fb 532hb: is1+s2−is3−s4

When these LP signals are radiated by LP satellite 532 and arrive at a desired destination with CP hub 533, the 4 CP channels will feature the following aggregated signals, assuming the amplitude attenuations and phase delays among the 4 propagation channels are identical:
RHCP channel at fa: y1(t)=is2+is4
LHCP channel at fa: y2(t)=s1+s3
RHCP channel at fb: y3(t)=is2−is4
LHCP channel at fb; y4(t)=s1−s3

A post processor, not shown, will calculate the s1, s2, s3, and s4 according the received y1, y2, y3, and y4, accordingly. In addition, the post processor performs amplitudes and phase equalizations among the propagation paths.

The relative phases between the CP components at two frequencies are critical. When the relative geometries among user 531, satellite 532 and hub 533 are fixed, the cumulative phase difference among signals at two separate frequencies propagating from source 531 via satellite 532 to destination 533 is constant. The total accumulated phase difference is therefore a constant. However when targeted satellite 532 is slowly drifting relative to users 531 and hub 533, the phase differences between two signals at two frequencies propagating from a use source location 531 to hub 533 will vary accordingly. In addition, there will be additional phase differentials due to Doppler effects At the destination 533, there are four concurrent receiving functions; RHCPa, RHCPb, LHCPa, and LHCPb. The associated phase and amplitude differential effects among the 4 propagation channels at different frequencies and polarizations must be continuously calibrated and equalized to assure the orthogonality among multiple WFs when arriving at destination 533.

Figure 5D:
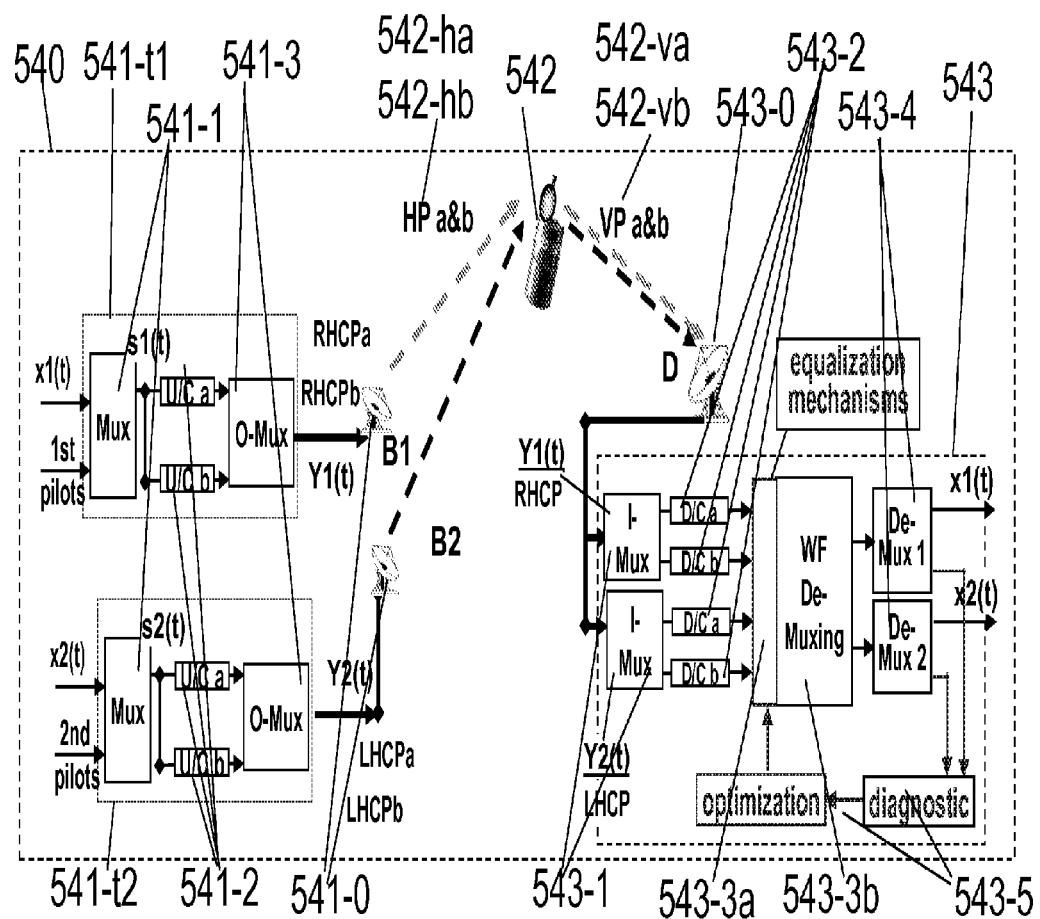
FIG. 5d illustrates a simplified block diagram of an implementation technique for FIG. 5c. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

FIG. 5d 540 illustrates a simplified block diagram of an implementation technique for FIG. 5c. Standard low-noise amplifiers (LNAs) and high power amplifiers (HPAs) are not shown. It depicts top level implementation concepts for the hub 533 as well as two 531a and 531b of the four users 531. Terminal 541-t1 for user 531a features transmissions of an identical signal stream s1 via two RHCP channels at fa and fb simultaneously. Embedded pilots for diagnostics are multiplexed 541-1 with a transmission stream x1(t). The mux processing may be a standard technique such as TDM, FDM, or CDM, minimizing bandwidth assets dedicated to probe signals supporting optimization loop 543-5 at the destination. The muxed signals are frequency up-converted 541-2 to two predetermined frequency slots before combined by a FDM output mux 541-3. The muxed signals are amplified and radiated by an antenna 541-0 to the designated satellite 542.

Similarly, the terminal 541-*t*2 for a second user 531*b* features transmissions of another identical signal stream s2 via two LHCP channels at fa and fb simultaneously. Embedded pilots for diagnostics are multiplexed 541-1 with a transmission stream x1(*t*). The mux processing may be a standard technique such as TDM, FDM, or CDM, minimizing bandwidth assets dedicated to probe signals supporting the optimization loop 543-5 at the destination. The muxed signals are frequency up-converted 541-2 to two predetermined frequency slots before combined by a FDM output mux 541-3. The muxed signals are amplified and radiated by an antenna 541-0 to the designated satellite 542.

The selected satellite 542 provides two pairs of LP SCPC channels; the inputs for channels 542-*ha* and 542-*va* are at fa, and those for channels 542-*hb* and 542-*vb* are at fb. The corresponding output frequencies are at fa' and fb' respectively.

At the destination 543, antenna 543-0 features independent RHCP and LHCP ports. The received RHCP signals Y1(*t*) and LHCP signals Y2(*t*) after conditioning (amplified and filtered), are FDM de-muxed 543-1 and frequency down converted 543-2, then fed into a bank of electronic filters 543-3*a* as an equalization mechanism before the WF demuxing processor 543-3*b*. The WF demuxer 543-3*b* features 4 output ports dedicated for users 531. Only two of the four are using the space asset for this example.

The corresponding outputs are de-muxed 543-4, separating desired signals x1(*t*), x2(*t*) and two sets of probe signals. The recovered probing signals are used by optimization loop 543-5 as diagnostic signals to equalize phase and amplitude differentials among multiple paths for orthogonal WF reconstructions.

Figure 6:
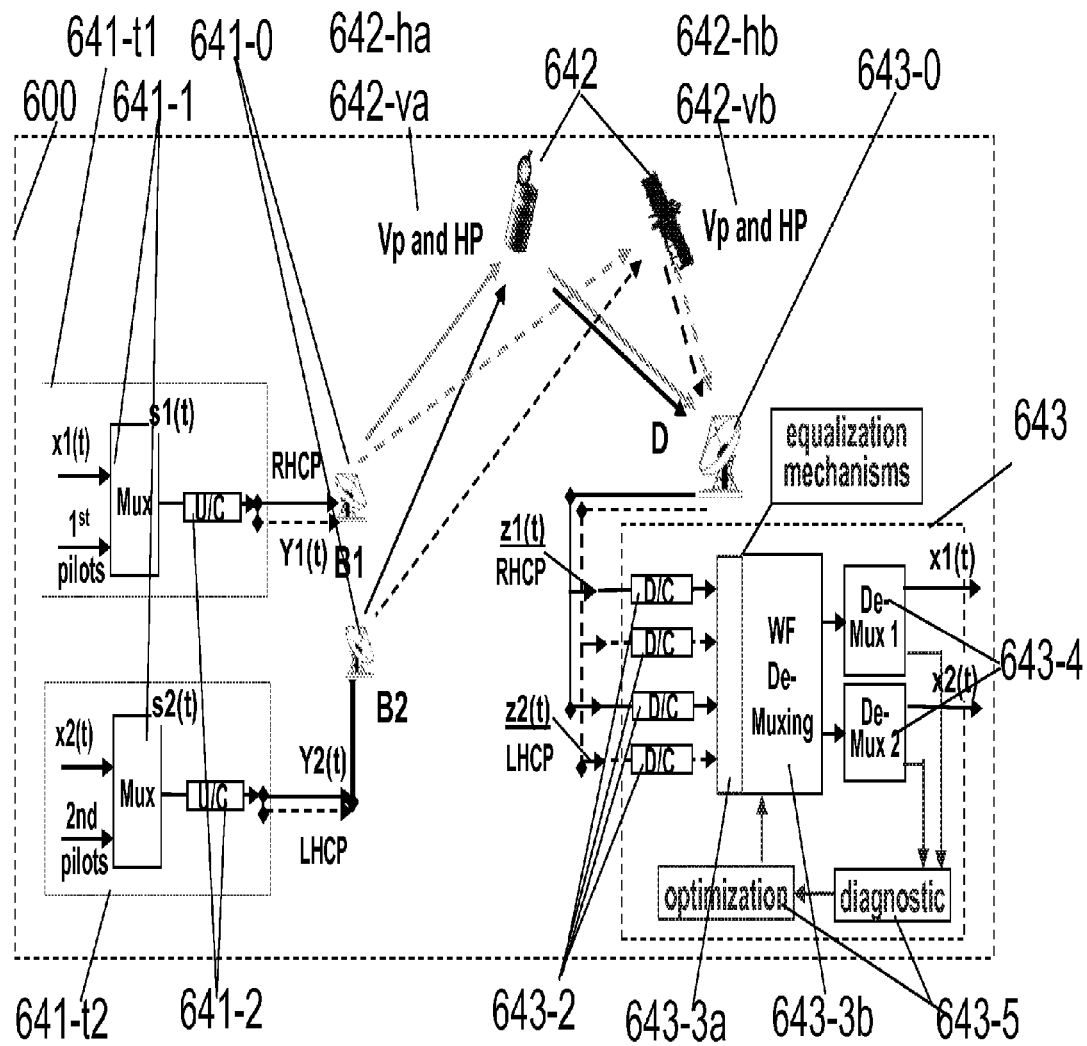
FIG. 6 illustrates a simplified block diagram of an implementation technique similar to for FIG. 5d. It is for scenarios with multiple LP channels in two satellites at a common frequency slot, instead of multiple LP channels in two common frequency slots in a satellite. Standard low-noise amplifiers (LNAs) and high power amplifiers (HPAs) are not shown. Diagnostic signals (pilots) are embedded to equalize phase and amplitude differentials among multiple paths for orthogonal WF reconstructions.

FIG. 6 600 illustrates a simplified block diagram of an implementation technique similar to FIG. 5*d*. It is for scenarios with multiple LP channels in two satellites 642 at a common frequency slot, instead of multiple LP channels in two common frequency slots in a satellite. Standard low-noise amplifiers (LNAs) and high power amplifiers (HPAs) are not shown. Diagnostic signals (pilots) are imbedded to equalize phase and amplitude differentials among multiple paths for orthogonal WF reconstructions.

The terminal 641-*t*1 for a first user 531*a* features transmissions of an identical signal stream s1 via two RHCP channels at fa via two satellites concurrently. The satellites cover a common service area for all users and the hubs from two separated orbital spots. Embedded pilot signals for diagnostics are multiplexed 641-1 with a transmission stream x1(*t*). The mux processing may be a standard technique such as TDM, FDM, or CDM minimizing bandwidth assets dedicated to probe signals support the optimization loop 643-5 at the destination. The muxed signals are frequency up-converted 641-2 to a predetermined frequency slot, and then amplified, power split into two signal paths, and then radiated by a multi-beam antenna 641-0 to two designated satellites 642 individually.

Similarly, the terminal 641-*t*2 for a second user 531*b* features transmissions of another identical signal stream s2 via two LHCP channels at fa via two satellite simultaneously. Embedded pilots for diagnostics are multiplexed 641-1 with a transmission stream x2(*t*). The mux processing may be a standard technique such as TDM, FDM, or CDM, minimizing bandwidth assets dedicated to probe signals which support the optimization loop 643-5 at the destination. The muxed signals are frequency up-converted 641-2 to a predetermined frequency slot, amplified, divided into two paths, then radiated by multi-beam antenna 641-0 to designated satellites 642.

Selected satellites 642 provide two pairs of LP SCPC channels; inputs 642-*ha* and 642-*va* are at satellite-1, and inputs 642-*hb* and 642-*vb* are at the second satellite. The corresponding output frequencies are at fa'.

At the destination 643, multi-beam antenna 643-0 features both RHCP and LHCP ports independently aiming at both satellites. The two received RHCP signals Y1(*t*), Y3(*t*) and two Rx LHCP signals Y2(*t*) and Y4(*t*) after conditioning (amplified and filtered), are frequency down converted 643-2, then fed into electronic filters 643-3*a* as an equalization mechanism before the WF demuxing processor 643-3*b*. The WF demuxer 643-3*b* features 4 output ports dedicated for users 531. Only two of the four are using the space asset for this example.

The corresponding outputs are de-muxed 643-4, separating desired signals x1(*t*), x2(*t*) and two sets of probe signals. The recovered probing signals are then used by optimization loop 643-5 as diagnostic signals to equalize phase and amplitude differentials among multiple paths for orthogonal WF reconstructions.

What is claimed is:

1. A satellite communication system comprising:
   a satellite comprising:
      a first transponder configured to form a first communication channel having a first polarization of a first polarization format; and
      a second transponder configured to form a second communication channel having a second polarization of the first polarization format;
   wherein the first transponder is configured to receive via the first communication channel at a first frequency slot a first combination of signals including a first linear combination of a first signal and a second signal, the first signal being transmitted by a first terminal via a third communication channel having a third polarization of a second polarization format, the second signal being transmitted by a second terminal via a fourth communication channel having a fourth polarization of the second polarization format,
   wherein the second transponder is configured to receive via the second communication channel at the first frequency slot a second combination of signals including a second linear combination of the first signal and the second signal, and
   wherein the first polarization format is different from the second polarization format.

2. The satellite communication system of claim 1, wherein the first polarization format is linear polarization format, the first polarization of the first polarization format is vertical polarization and the second polarization of the first polarization format is horizontal polarization.

3. The satellite communication system of claim 1, wherein the second polarization format is circular polarization format, the third polarization of the second polarization format is right-hand circular polarization and the fourth polarization of the second polarization format is left-hand circular polarization.

4. The satellite communication system of claim 1, wherein the first polarization format is circular polarization format, the first polarization of the first polarization format is right-hand circular polarization and the second polarization of the first polarization format is left-hand circular polarization, and wherein the second polarization format is linear polarization format, the third polarization of the second polarization format is vertical polarization and the fourth polarization of the second polarization format is horizontal polarization.

5. The satellite communication system of claim 1, wherein the first transponder and the second transponder respectively radiate the received first combination of signals and the received second combination of signals to a destination terminal, and wherein the destination terminal receives the radiated first combination of signals and the radiated second combination of signals, the destination terminal comprising a polarization-realignment unit to equalize amplitude differential, frequency drift and phase differential between the received radiated first combination of signals and the received radiated second combination of signals.

6. The satellite communication system of claim 5, wherein the polarization-realignment unit is configured to reconstruct the first signal and the second signal from the received radiated first combination of signals and the received radiated second combinations of signals.

7. The satellite communication system of claim 1, wherein the satellite further comprises:
   a third transponder configured to form a fifth communication channel having the first polarization of the first polarization format; and
   a fourth transponder configured to form a sixth communication channel having the second polarization of the first polarization format;
wherein the third transponder is configured to receive via the fifth communication channel at a second frequency slot a third combination of signals including the first signal and the second signal, and
wherein the fourth transponder is configured to to receive via the sixth communication channel at the second frequency slot a fourth combination of signals including the first signal and the second signal.

8. The satellite communication system of claim 7, wherein the first polarization format is circular polarization format, the first polarization of the first polarization format is right-hand circular polarization and the second polarization of the first polarization format is left-hand circular polarization, and wherein the second polarization format is linear polarization, the third polarization of the second polarization format is vertical polarization and the fourth polarization of the second polarization format is horizontal polarization.

9. The satellite communication system of claim 7, wherein the first terminal transmits the first signal via the third communication channel at the first frequency slot and at the second frequency slot.

10. The satellite communication system of claim 9, wherein the second terminal transmits the second signal via the fourth communication channel at the first frequency slot and at the second frequency slot.

11. The satellite communication system of claim 7, wherein each of the first signal and the second signal is processed by a wavefront multiplexing processor before being transmitted by the first terminal and the second terminal, respectively.

12. The satellite communication system of claim 7, wherein the first polarization format is linear polarization format, the first polarization of the first polarization format is vertical polarization and the second polarization of the first polarization format is horizontal polarization.

13. The satellite communication system of claim 1, wherein each of the first and second combinations of signals further comprises a respective linear combination of a third signal and a fourth signal, the third signal being-transmitted by a third terminal via a seventh communication channel having the third polarization of the second polarization format, the fourth signal being transmitted by a fourth terminal via an eighth communication channel having the fourth polarization of the second polarization format.

14. The satellite communication system of claim 1, wherein the first linear combination of the first signal and the second signal is orthogonal in phase to the second linear combination of the first signal and the second signal.

15. The satellite communication system of claim 7, wherein each of the first, second, third and fourth combinations of signals further comprises a respective linear combination of a third signal and a fourth signal, the third signal being transmitted by a third terminal via a seventh communication channel having the third polarization of the second polarization format, the fourth signal being transmitted by a fourth terminal via an eighth communication channel having the fourth polarization of the second polarization format.

16. The satellite communication system of claim 15, wherein the first terminal transmits the first signal via the third communication channel at the first frequency slot and at the second frequency slot, wherein the second terminal transmits the second signal via the fourth communication channel at the first frequency slot and at the second frequency slot, wherein the third terminal transmits the third signal via the seventh communication channel at the first frequency slot and at the second frequency slot, and wherein the fourth terminal transmits the fourth signal via the eighth communication channel at the first frequency slot and at the second frequency slot.

17. The satellite communication system of claim 15, wherein the first polarization format is linear polarization format, the first polarization of the first polarization format is vertical polarization and the second polarization of the first polarization format is horizontal polarization, and wherein the second polarization format is circular polarization format, the third polarization of the second polarization format is right-hand circular polarization and the fourth polarization of the second polarization format is left-hand circular polarization.

18. The satellite communication system of claim 15, wherein the first polarization format is circular polarization format, the first polarization of the first polarization format is right-hand circular polarization and the second polarization of the first polarization format is left-hand circular polarization, and wherein the second polarization format is linear polarization format, the third polarization of the second polarization format is vertical polarization and the fourth polarization of the second polarization format is horizontal polarization.

* * * * *